United States Patent [19]
Maeda

[11] Patent Number: 4,853,913
[45] Date of Patent: Aug. 1, 1989

[54] PICK-UP CONTROL CIRCUITS FOR DISC INFORMATION REPRODUCING APPARATUS

[75] Inventor: Satoru Maeda, Yokohama, Japan

[73] Assignee: Kabushiki Kaisha Toshiba, Kanagawa, Japan

[21] Appl. No.: 875,110

[22] Filed: Jun. 17, 1986

[30] Foreign Application Priority Data

Jun. 17, 1985 [JP] Japan .................. 60-131251
Jun. 17, 1985 [JP] Japan .................. 60-131254

[51] Int. Cl.⁴ .................................. G11B 17/22
[52] U.S. Cl. .............................. 369/32; 369/33; 369/43; 369/44
[58] Field of Search ............... 369/32, 30, 44, 36, 369/39, 25, 28, 43, 45

[56] References Cited

U.S. PATENT DOCUMENTS

| | | | |
|---|---|---|---|
| 4,545,003 | 10/1985 | Hirano et al. | 369/44 |
| 4,603,412 | 7/1986 | Yamazaki | 369/43 |
| 4,607,358 | 8/1986 | Maeda et al. | 369/32 |
| 4,675,855 | 6/1987 | Iso et al. | 369/32 |
| 4,701,897 | 10/1987 | Nakagawa | 369/32 |
| 4,701,898 | 10/1987 | Giddings | 369/32 |

Primary Examiner—William M. Shoop, Jr.
Assistant Examiner—Brian Young
Attorney, Agent, or Firm—Finnegan, Henderson, Farabow, Garrett, & Dunner

[57] ABSTRACT

Pick-up control circuits for disc information reproducing apparatus. The apparatus includes a carriage, a source of a light beam mounted in the carriage, a focus lens for placing the light beam on a disc, the focus lens being mounted on a standard position in the carriage but movable by a prescribed range from the standard position, a circuit for detecting a tracking error signal responsive to a deviation of the light beam from a center of the track, a lens actuator for driving the focus lens to deviate from the standard position, a carriage actuator for driving the carriage to move in the radial direction in respect of the disc, a power source for applying a drive voltage to the carriage actuator, a switch connected between the power source and the carriage actuator, and a circuit for controlling the switch to apply the drive voltage intermittently to the carriage actuator, so that focus lens is moved to the standard position on or before reaching an end of the movable range.

10 Claims, 9 Drawing Sheets

PICK-UP CONTROL CIRCUITS FOR DISC INFORMATION REPRODUCING APPARATUS

BACKGROUND OF THE INVENTION

1. Field of the Invention

This invention relates generally to an apparatus for reproducing information recorded on optical record discs, such as digital audio discs or video discs, and more particularly, to drive control circuits for pick-up devices of a disc information reproducing apparatus.

2. Description of Related Art

There have been provided optical record discs which store optically recorded information data or signals such as digitized audio signals, video or image signals and record disc reproducing apparatus for reproducing the recorded information data. Such the optical record discs for example compact discs (CD) (a type of digital audio discs), optical video disc, optical discs and the like are so arranged that digital data intended for high density recording are recorded in the form of pit strings forming a spiral track or a plurality of concentric tracks on one side of the disc and reproduced through reading the pit strings by means of a transducer means such as an optical pick-up device using laser beams. The optical pick-up device is provided with a lens for placing the laser beam on the record disc and a lens actuator for controlling the laser beam placing lens, etc., and a carriage thereof so that the pick-up device may accurately follow or trace the continuous concentric tracks or the spiral track. The range that the beam placing lens may move in the pick-up device is limited to, e.g., the range corresponding to dozens of tracks or so. Additionally, there is further provided a pick-up actuator for moving the pick-up device radially with respect to the disc surface, in the disc information reproducing apparatus.

Therefore, the disc information reproducing apparatus is so provided that the pick-up device may track the continuous concentric tracks or the spiral track through a cooperation of the lens actuator for controlling the beam placing lens and the pick-up actuator for controlling the pick-up device. Drive signals for the lens actuator and the pick-up actuator are usually obtained from a tracking error signal obtained in response to deviation of the laser beam from the center of the track. A lens actuator drive signal works for making the beam placing lens deviate from its standard position in the pick-up device, while a pick-up drive signal works for moving the pick-up device so that the deviation of the beam placing lens from the standard position decreases. The lens actuator may move the beam placing lens in response to the lens actuator drive signal with a relatively high sensitivity because the beam placing lens has a relatively light mass, while the pick-up actuator may move the beam placing lens in response to the lens actuator drive signal with a relatively low sensitivity because the pick-up device has a relatively heavy mass. Moreover, there are a large friction and a backlash in a mechanical coupling between the pick-up device and the pick-up actuator. Therefore, in the reproducing operation for continuously tracing the concentric tracks or the spiral track radially in reference to the record disc, the pick-up device moves intermittently after the beam placing lens is deviated from the standard position in each direction in respect to the record disc for about 200 micrometers ($\mu$) corresponding to a a range of about 120 number of tracks.

Further, in conventional disc information reproducing apparatus, the pick-up drive signal or voltage is continually applied to the pick-up actuator, while the pick-up device is left unmoved until the pick-up drive voltage has increased to a level sufficient to drive the pick-up device against the mass, the friction and the backlash. In other words, the pick-up device is moved intermittently in spite of the pick-up drive voltage being always applied thereto. This causes power responding to the pick-up drive voltage to be consumed wastefully during the period that the pick-up device is left unmoved. The power consumption has become a serious problem for battery-driven record disc repoducing apparatus type. Further, there has occured an undesired mechanical vibration or a noise at the mechanical coupling between the pick-up device and the pick-up actuator during the period that the pick-up device is left unmoved.

SUMMARY OF THE INVENTION

Accordingly, it is an object of the present invention to provide a disc information reproducing apparatus which may operate with a relatively low power consumption.

It is another object of the present invention to provide a disc information reproducing apparatus which may operate with a small mechanical vibration.

It is still another object of the present invention to provide a disc information reproducing apparatus which may operate with a small noise.

These and other objects of the present invention are achieved in a disc information reproducing apparatus. The apparatus includes a carriage, a source of a light beam mounted in the carriage, a focus lens for placing the light beam on a disc, the focus lens being mounted on a standard position in the carriage but movable by a prescribed range from the standard position, a circuit for detecting a tracking error signal responsive to a deviation of the light beam from a center of the track, a lens actuator for driving the focus lens to deviate from the standard position, a carriage actuator for driving the carraige to move in the radial direction with respect to the disc, a power source for applying a drive voltage to the carriage actuator, a switch connected between the power source and the carriage actuator, and a circuit for controlling the switch to apply the drive voltage intermittently to the carriage actuator, so that focus lens is moved to the standard position on or before reaching an end of the movable range.

Additional objects, advantages, and features of the present invention will further become apparent to persons skilled in the art from a study of the following description and of the accompanying drawings, in which:

DESCRIPTION OF THE PREFERRED EMBODIMENTS

Figure 1:
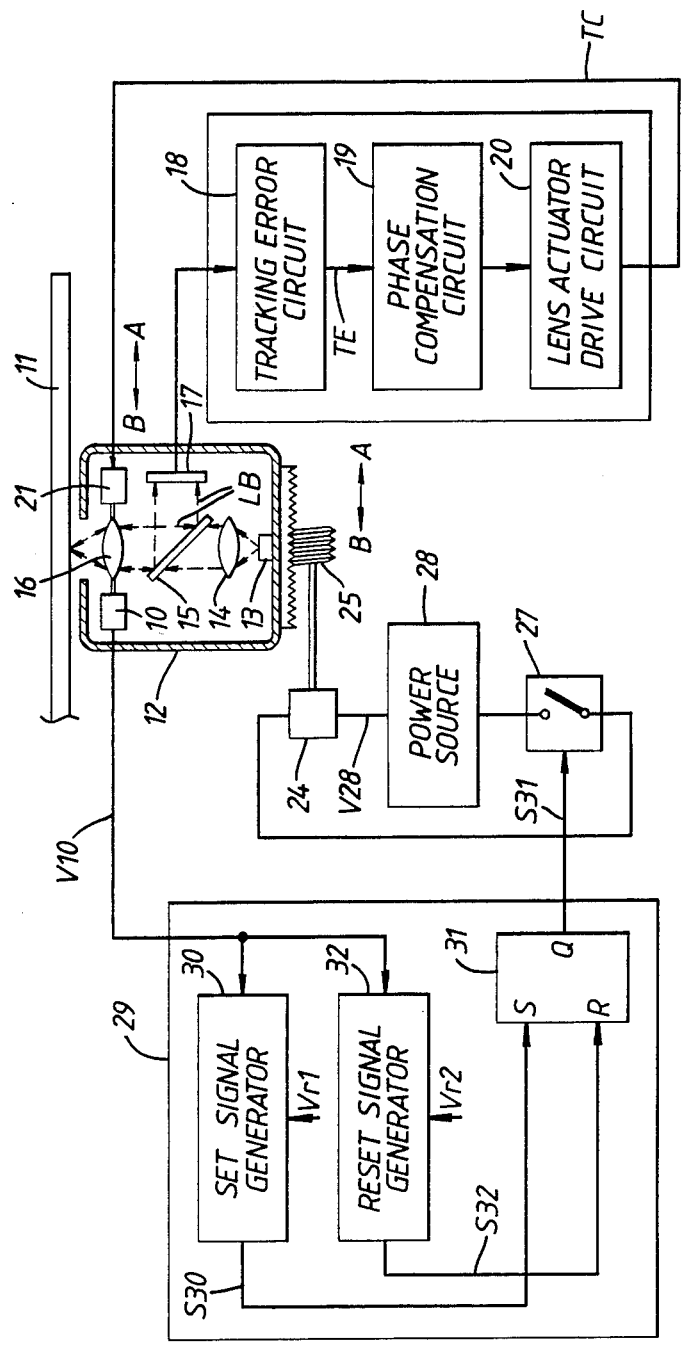
FIG. 1 is a block diagram of a disc information reproducing apparatus according to a first embodiment of the present invention.
Figure 2:
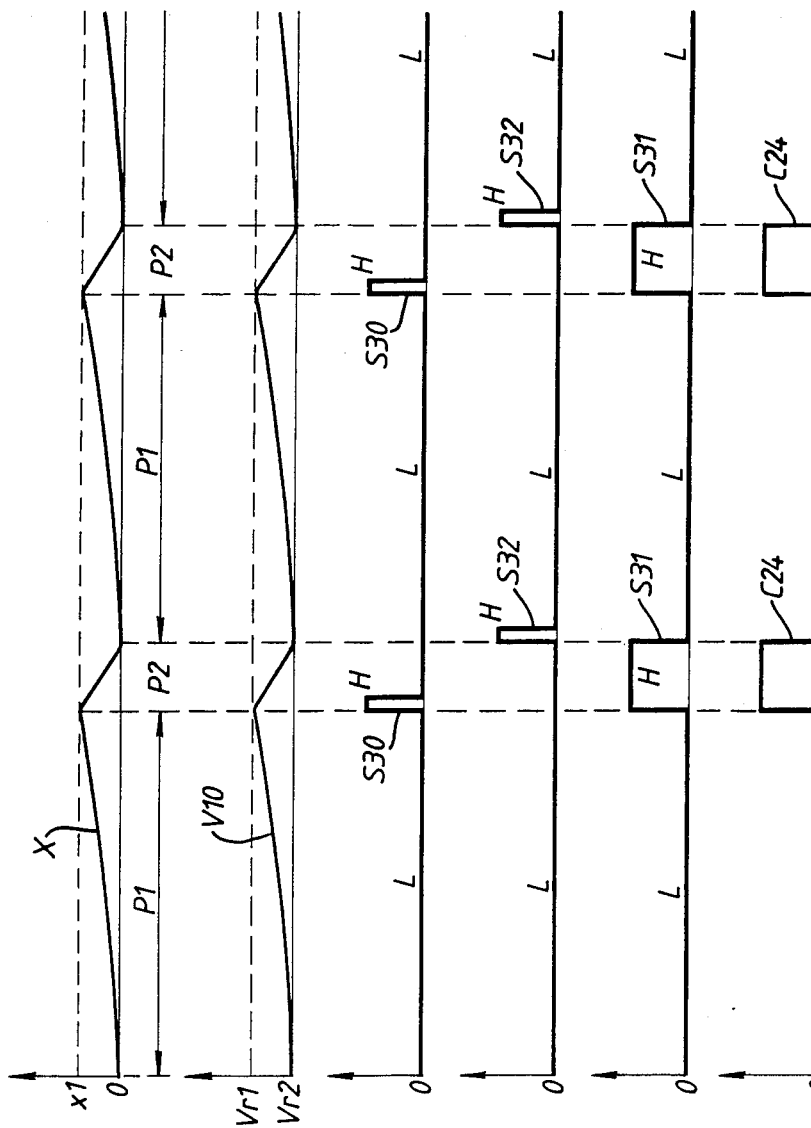
FIG. 2 is a timing chart used for explaining the operation of the apparatus shown in FIG. 1.

The present invention will now be described in detail with reference to FIGS. 1 to 9. Throughout the drawings, like reference numerals or letters are used to designate like or equivalent elements.

Referring first to FIG. 1, description will be made to a fundamental block diagram of a record disc reproducing apparatus according to the present invention.

In FIG. 1, an optical record disc 11 is provided to rotate about its center. Optical record disc 11 bears on its surface a plurality of concentric information recording tracks tracks or connected with each other in entirely a spiral track. A symbolically represented pick-up device 12 is movably supported on a feeder 25. Feeder 25 is driven by a pick-up actuator 24 so that pick-up device 12 moves radially in reference to the surface of disc 11. Pick-up device 12 comprises a carriage 12a, a source of a light beam, e.g., a laser diode 13, a collimator lens 14, a semi-transparent mirror 15, a device for placing laser beam LB on record disc 11, e.g., a focus lens 16, a split-photosensor 17, a lens actuator 21 and a lens deviation sensor 10. Laser diode 13 radiates a laser beam LB. Collimator lens 14, semi-transparent mirror 15 and focus lens 16 guide laser beam LB to optical record disc 11 so that laser beam LB is placed on optical record disc 11 in a form of light spot. Pick-up device 12 then sequentially scans the concentric tracks or the spiral track with the light spot of laser beam LB, by moving radially in a direction of an arrow A in the drawing during a reproducing operation. Laser beam LB is reflected by optical record disc 11 and then applied to split-photosensor 17 through focus lens 16 and semi-transparent mirror 15. Split-photosensor 17 detects from the reflected laser beam LB information relating to a state, e.g., a strength of the reflected laser beam LB and produces an electrical signal responding to the information.

Focus lens 16 is movably mounted on carriage 12a of pick-up device 12, while lens actuator 21 and lens deviation sensor 10 are associated with focus lens 16. Lens actuator 21 controls a position of focus lens 16 so that the light spot of laser beam LB follows a center of a prescribed track in, e.g., the reproducing operation. The control of focus lens 16 may be made by a conventional tracking control system as described below.

The tracking control system is made in a servo loop which is comprised of split-photosensor 17, a tracking error circuit 18, a phase compensation circuit 19, a lens actuator drive circuit 20 and lens actuator 21. The electrical signal obtained by split-photosensor 17 is applied to tracking error circuit 18. Tracking error circuit 18 processes the electrical signal so that tracking error circuit 18 produces a tracking error signal TE responding to a deviation of the scanning position of pick-up device 12 from the center of the track then being scanned. Tracking error signal TE is applied to lens actuator drive circuit 20 through phase compensation circuit 19. Lens actuator drive circuit 20 produces a lens actuator drive signal TC responding to tracking error signal TE. Lens actuator drive signal TC is applied to lens actuator 21 of pick-up device 12. Lens actuator 21 drives focus lens 16 in response to lens actuator drive signal TC so as that tracking error signal TE from laser beam LB reflected from record disc 11 and applied through focus lens 16 and semi-transparent mirror 15 decreases. Therefore, focus lens 16 is driven by lens actuator 21 so as that the light spot of laser beam LB is kept placed on the center of the prescribed track.

When lens actuator 21 fails to be applied with lens actuator drive signal TC or lens actuator drive signal TC is negligibly small, focus lens 16 is kept on its standard position in pick-up device 12. However, focus lens 16 deviates farther from the standard position as the reproducing operation progresses. That is, focus lens 16 is moved in the direction of arrow A by lens actuator 21. The deviation or the distance of focus lens 16 from the standard position is indicated by a graph X in FIG. 2. Deviation X of focus lens 16 is detected by lens deviation sensor 10. Lens deviation sensor 10 produces a deviation signal as indicated by a graph V10 in FIG. 2, in response to deviation X. Deviation signal V10 is applied to a pick-up actuator control circuit 29 which is comprised of a set signal generator 30, a set-reset flip flop (S-R FF) 31 and a reset signal generator 32. Deviation signal V10 is applied to set signal generator 30 and reset signal generator 32 of pick-up actuator control circit 29 in parallel. Both set signal generator 30 and reset signal generator 32 are, for example, comprised of comparator circuits. The comparator of set signal generator 30 is applied with a first reference signal Vr1, while the comparator of reset signal generator 32 is applied with a second reference signal Vr2 which is lower than first reference signal Vr1. When deviation signal V10 is the same or higher than first reference signal Vr1, set signal generator 30 produces a first comparison output or set signal S30 of a high (H) level and applies it to a set input S of S-R FF 31. S-R FF 31 applies a control signal S31 of the H level outputted from its Q output to a switch 27, responding to set signal S30 of the H level from set signal generator 30. Switch 27 is turned ON in response to control signal S31 of the H level. Pick-up actuator 24 is then applied with a drive voltage V28 from a power supply source 28. A current flowing through pick-up actuator 24 therefore changes as indicated by a graph C24 in FIG. 2. Drive voltage V28 is so set to a large value that pick-up actuator 24 may sufficiently actuate actuates pick-up device 12 through feeder 25.

Pick-up actuator 24 transfers pick-up device 12 through feeder 25 in the same direction as arrow A that lens actuator 21 has moved focus lens 16 previously. When pick-up device 12 moves in the direction of arrow A, focus lens 16 is so controlled that it moves in a direction of an arrow B opposite to arrow A. In this time, therefore, deviation signal V10 of lens deviation sensor 10 decreases. When deviation signal V10 has decreased lower than second reference signal Vr2, reset signal generator 32 produces a second comparison output or a reset signal S32 of the H level and applies it to a reset input R of S-R FF 31. S-R FF 31 is then reset so that control signal S31 outputted from its Q output is changed to a low (L) level, in response to reset signal S32 of the H level from reset signal generator 32. Switch 27 turns OFF in response to control signal S31 of the L level. Pick-up actuator 24 then fails to be applied with drive voltage V28 from power supply source 28.

The above-mentioned first reference signal Vr1 and second reference signal Vr2 for the comparators of set signal generator 30 and reset signal generator 32 are set as follows. A movable range of focus lens 16 in pick-up device 12 is limited to the range of about 200μ in each dirction of arrow A or B from the standard position. Then, first reference signal Vr1 is set to a voltage that lens deviation sensor 10 generates when focus lens 16 has deviated a prescribed distance x1 close to the end of the range, about 200μ, from the standard position, while first reference signal Vr1 is set to a voltage of zero volts or approximately zero volts. Therefore, first pick-up device 12 is left unmoved but focus lens 16 is actuated to move in the direction of arrow A by lens actuator 21. When focus lens 16 has moved the distance x1, deviation signal V10 of lens deviation sensor 10 agrees with first reference signal Vr1 so that S-R FF 31 of pick-up actuator control circuit 29 applies control signal S31 of the H level to switch 27. Switch 27 then turns ON and pick-up actuator 24 moves pick-up device 12 through feeder 25 in the direction of arrow A with drive voltage V28 which is sufficient to drive pick-up device 12 steadily and rapidly. As a result, focus lens 16 is able to return to the standard position in a period p2 which is comparatively shorter than a period p1 of focus lens 16 having been moved previously. During period p2, focus lens 16 is returned to the standard position so that deviation signal V10 of lens deviation sensor 10 decreases. When deviation signal V10 of lens deviation sensor 10 agrees with second reference signal Vr2, S-R FF 31 is reset by reset signal S32 of H level from reset signal generator 32 so that control signal S31 is changed to the L level. Switch 27 then turns OFF so that pick-up actuator 24 fails to move pick-up device 12 through feeder 25. After pick-up device 12 has stopped, a next movement of focus lens 16 in the direction of arrow A for scanning following tracks of record disc 11 covered by the movable range of focus lens 16 is started.

Figure 3:
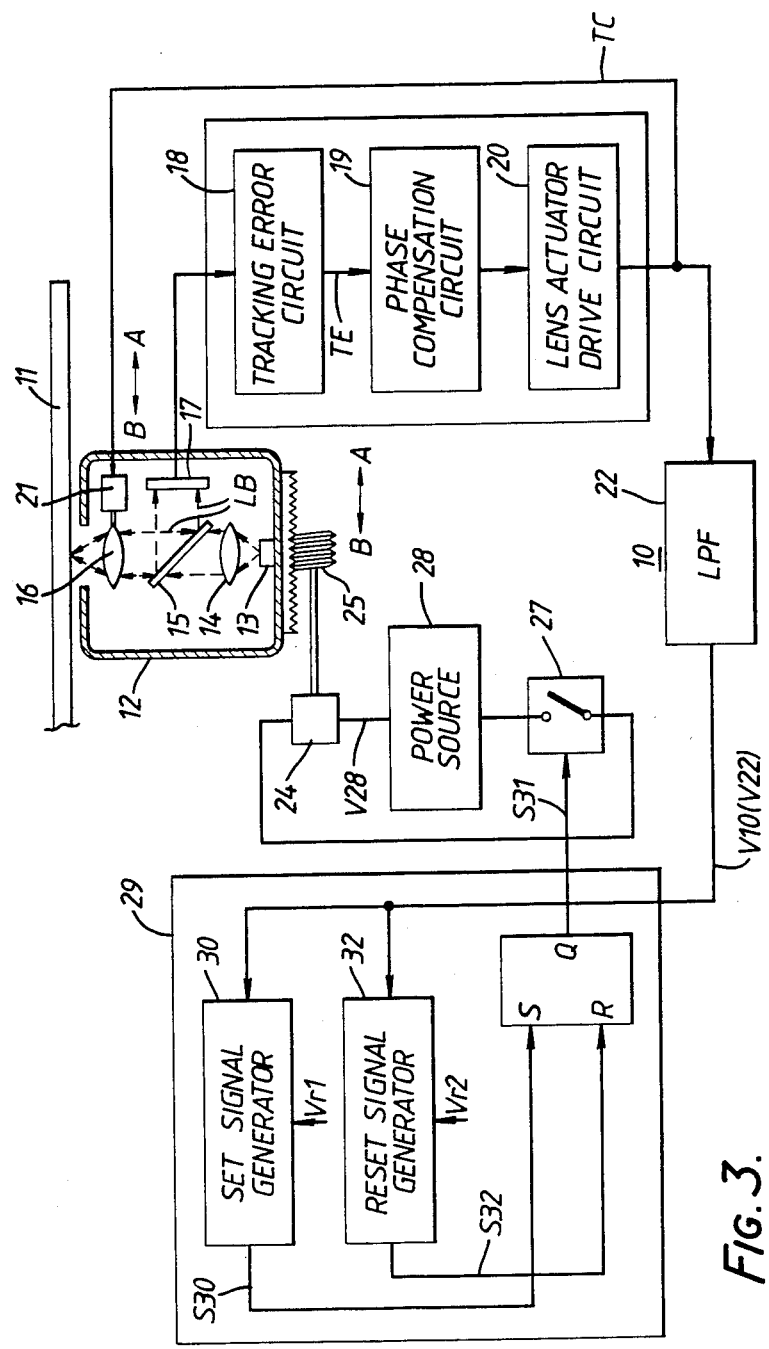
FIG. 3 is a block diagram of a record disc reproducing apparatus according to a second embodiment of the present invention.

Referring now to FIG. 3, there is shown a second embodiment of the present invention. In FIG. 3, lens deviation sensor 10 is connected to the servo control loop for focus lens 16. That is, lens deviation sensor 10 in the second embodiment is indirectly associated with focus lens 16, while lens deviation sensor 10 of the first embodiment shown in FIG. 1 is directly associated with focus lens 16. Other portions of the second embodiment are equivalent to those of the first embodiment. Accordingly, descriptions will be mainly made for portions different from the first embodiment hereafter.

In FIG. 3, lens deviation sensor 10 is comprised of a low pass filter (LPF) 22 connected to the output terminal of lens actuator drive circuit 20 in the servo control loop for focus lens 16. LPF 22 detects a DC component of lens actuator drive signal TC from lens actuator drive circuit 20. An output V22 of LPF 22, i.e., the DC component of lens actuator drive signal TC responds to deviation X or the distance of focus lens 16 from the standard position. As a result, lens actuator drive signal TC quickly becomes larger for activating lens actuator 21 as the deviation X of focus lens 16 from the standard position progresses. Therefore, output V22 of LPF 22 as the DC component of lens actuator drive signal TC responds to deviation X of focus lens 16 from the standard position and serves for deviation signal V10. Deviation signal V10 is then applied to pick-up actuator control circuit 29 so that an operation identical to that of the first embodiment will be performed.

Figure 4:
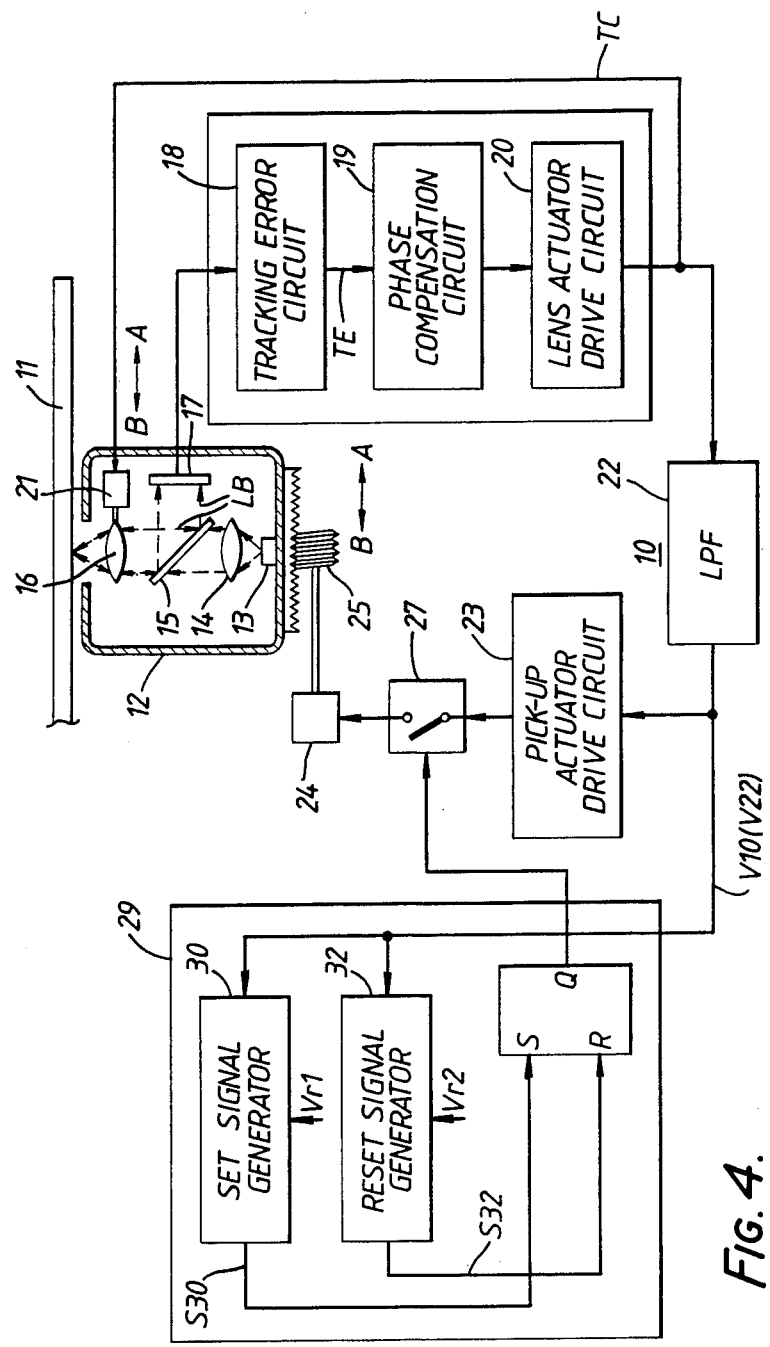
FIG. 4 is a block diagram of a record disc reproducing apparatus according to a third embodiment of the present invention.

Referring now to FIG. 4, there is shown a third embodiment of the present invention. In FIG. 4, switch 27, pick-up actuator 24 and a pick-up actuator drive circuit 23 are connected to the servo control loop for focus lens 16 through LPF 22 of lens deviation sensor 10. Other portions of the third embodiment are equivalent to those of the second embodiment. Accordingly, descriptions will be mainly made for portions different from the second embodiment hereafter.

In FIG. 4, LPF 22 of lens deviation sensor 10 applies its output, i.e., output V22 of LPF 22 or deviation signal V10 to pick-up actuator drive circuit 23 through switch 27 as well as pick-up actuator control circuit 29. Pick-up actuator drive circuit 23 applies to pick-up actuator 24 its output V23, a drive voltage responding to deviation signal V10 when switch 27 is turned ON. As a result, pick-up actuator 24 is driven by the voltage based on deviation signal V10, i.e., the DC component of lens actuator drive signal TC or output V22 of LPF 22. However, the application of deviation signal V10 to pick-up actuator 24 is controlled by pick-up actuator control circuit 29 in a manner identical with the first or the second embodiment. Therefore, pick-up actuator 24 is kept deactivated during period p1 (see FIG. 2) in that deviation signal V10 or output V22 of LPF 22 is lower than first referencre signal Vr1.

The third embodiment of the present invention may be modified further as follows. Specifically, switch 27 and pick-up actuator 24 are able to be connected to the servo control loop through another low pass filter which is for the exclusive use of pick-up actuator 24, as opposed to LPF 22 of lens deviation sensor 10 which is for the exclusive use of pick-up actuator control circuit 29. Furthermore, pick-up actuator drive circuit 23 may be omitted if deviation signal V10 is available for driving pick-up actuator 24 without any signal conversion.

Figure 5:
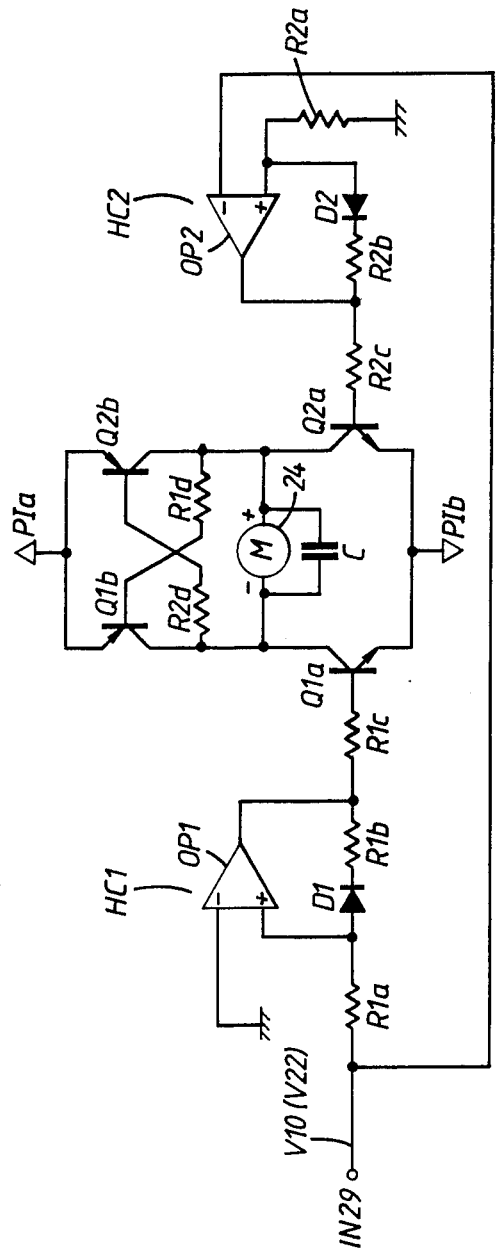
FIG. 5 is a detailed circuit diagram of another embodiment a pick-up actuator control circuit for use in of the embodiments shown in FIGS. 1, 3 and 4.

Referring now to FIG. 5, there is shown a detailed circuit diagram of an embodiment of pick-up actuator control circuit 29 of the first, second and third embodiments. In FIG. 5, an input terminal IN29 is provied for receiving deviation signal V10 from lens deviation sensor 10 (see FIG. 1) or output V22 of LPF 22 (see FIGS. 3, 4). Deviation signal V10 or V22 on input terminal IN29 is applied to a first and a second hysteresis circuit HC1 and HC2. These hysteresis circuits HC1 and HC2 respectively correspond to pick-up actuator control circuit 29 of the first, second and third embodiments. First hysteresis circuit HC1 is served for forwarding pick-up device 12 (see FIGS. 1, 3 and 4) in the direction of arrow A in the normal reproducing operation, while second hysteresis circuit HC2 is served rewarding reversing pick-up device 12 (see FIGS. 1, 3 and 4) in the direction of arrow B. Second hysteresis circuit HC2 operates when pick-up device 12 runs over a distance corresponding to distance x1 that focus lens 16 has previously moved due to an inertia of pick-up device 12 itself or other reasons.

First hysteresis circuit HC1 is comprised of an operational amplifier OP1, a diode D1 and two resistors R1a and R1b. A non-inversed output of operational amplifier OP1 is connected to input terminal IN29 through resistor R1a, while an inversed input of operational amplifier OP1 is connected to a ground potential source, i.e., the ground. An output of operational amplifier OP1 is connected to its non-inversed input through resistor R1b and diode D1. Diode D1 is connected in inverse bias direction. Second hysteresis circuit HC2 is comprised of an operational amplifier OP2, a diode D2 and two resistors R2a and R2b. An inversed input of operational amplifier OP2 is connected to input terminal IN29, while a non-inversed input of operational amplifier OP2 is connected to the ground potential source through resistor R2a. An output of operational amplifier OP2 is connected to its non-inversed input through resistor R2b and diode D2. Diode D2 is also connected in inverse bias direction.

The outputs of both operational amplifiers OP1 and OP2 are connected to base terminals of switch transistors Q1a and Q2a of NPN type respectively through resistors R1c and R2c. Switch transistors Q1a and Q2a respectively correspond to switch 27 (see FIGS. 1, 3 and 4). Switch transistor Q1a is connected at its collector terminal to a power input terminal PIa through a PNP transistor Q1b, while its emitter is connected to another power input terminal PIb. Switch transistor Q2a is connected at its collector terminal to power input terminal PIa through a PNP transistor Q2b, while its emitter is connected to another power input terminal PIb. Power input terminals PIa and PIb are provided for receiving deviation signal V10 (see FIG. 1) or V22 (see FIGS. 3 and 4). The base terminal of PNP transistor Q1b is connected to a positive input terminal of pick-up actuator 24, for example a motor, as well as to collector terminals of transistors Q2a and Q2b through a resistor R1d while the base terminal of PNP transistor Q2b is connected to a negative input terminal of pick-up actuator 24 as well as to collector terminals of transistors Q1a and Q1b through a resistor R2d. There is further connected a capacitor C in parallel with pick-up actuator 24.

When deviation signal V10 or V22 of one polarity exceed a first prescribed offset voltage Vos1 given by a reverse saturation voltage Vrs of diodes, e.g., diode D1 and a voltage across resistor R1a, the output of operational amplifier OP1 changes to the H level. First prescribed offset voltage Vos1 corresponds to first reference signal Vr1 of the first, second and third embodiments. Moreover, resistor R1a is provided for adjusting the offset voltage. Then switch transistor Q1a turns ON so that NPN transistor Q2b is biased to ON while NPN transistor Q1b is left biased in the OFF state. Therefore, a current responding to deviation signal V10 or V22 flows through NPN transistor Q2b, pick-up actuator 24 and switch transistor Q1a. As a result pick-up device 12 is driven in the direction of arrow B by pick-up actuator 24 through feeder 25. According to the movement of pick-up device 12 in the direction of arrow B, deviation signal V10 or V22 decreases as described previously. When deviation signal V10 or V22 decreases to the ground level, the output of operational amplifier OP1 changes to the L level. Then switch transistor Q1a turns OFF so that NPN transistor Q2b is biased to OFF. The ground level applied to operational amplifiers OP1 and OP2 corresponds to second reference signal Vr2 of the first, second and third embodiments. Therefore pick-up actuator 24 is deactivated and pick-up device 12 is stopped.

When pick-up device 12 overruns in the direction of arrow B, focus lens 16 is deviated from the standard position in pick-up device 12 in the direction of arrow B. As a result, deviation signal V10 or output V22 of LPF 22 of another polarity is generated by lens deviation sensor 10 or LPF 22. Deviation signal V10 or output V22 of LPF 22 of the other polarity is sensed at second hysteresis circuit HC2. When deviation signal V10 or output V22 of LPF 22 of the other polarity exceeds a second prescribed offset voltage Vos2 given by reverse saturation voltage Vrs of diodes and a voltage across resistor R2a, the output of operational amplifier OP2 changes to the H level. Then switch transistor Q2a turns ON so that NPN transistor Q1b is biased to ON while NPN transistor Q2b is left biased in the OFF state. Therefore, a current responding to deviation signal V10 or output V22 of LPF 22 of the other polarity flows through NPN transistor Q1b, pick-up actuator 24 and switch transistor Q2a. As a result pick-up device 12 is driven in the direction of arrow A by pick-up actuator 24 through feeder 25. According to the movement of pick-up device 12 in the direction of arrow A, deviation signal V10 or output V22 of LPF 22 of the other polarity decreases. When deviation signal V10 or output V22 of LPF 22 of the other polarity decreases to the ground level, the output of operational amplifier OP2 changes to the L level. Then switch transistor Q2a turns OFF so that NPN transistor Q1b is biased to OFF. Therefore pick-up actuator 24 is deactivated and pick-up device 12 is stopped.

Figure 6:
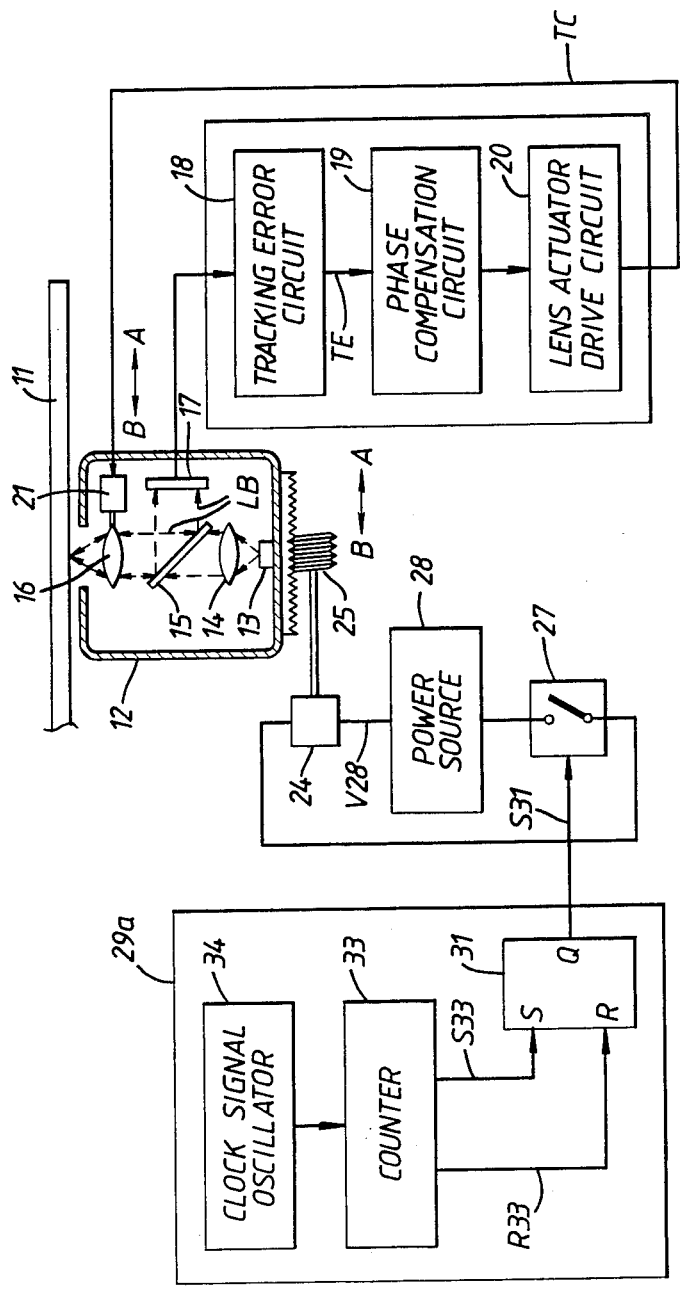
FIG. 6 is a block diagram of a disc information reproducing apparatus according to a fourth embodiment of the present invention.
Figure 7:
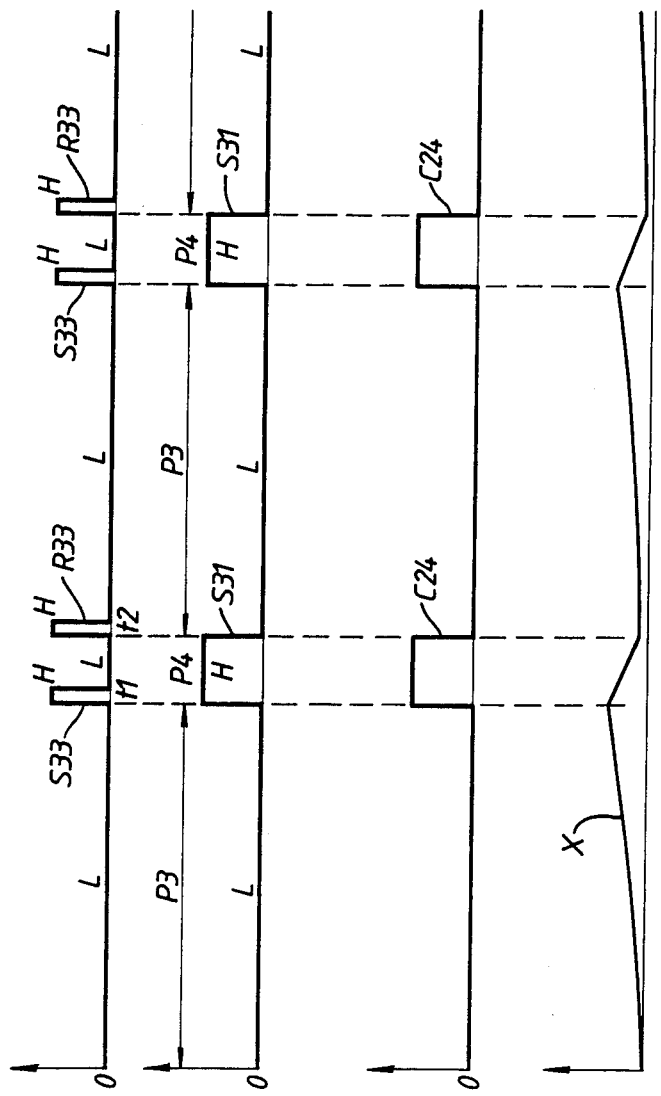
FIG. 7 is a timing chart used for explaining the operation of the apparatus shown in FIG. 6.

Referring now to FIGS. 6 and 7, there are shown a fourth embodiment of the present invention and graphs of timing chart for explaining an operation of the fourth embodiment. In FIG. 6, another type of pick-up actuator control circuit 29a is provided but it is independent from any means for detecting deviation X or the position of focus lens 16. In other words, there is removed from FIG. 5 a deviation detecting device or apparatus corresponding to lens deviation sensor 10 in FIGS. 1, 3 and 4. Other portions of the second embodiment are equivalent to those of the first embodiment. Accordingly, descriptions will be mainly made for portions different from the first embodiment hereafter.

In FIG. 6, pick-up actuator control circuit 29a is constituted by a timing signal oscillator. The timing signal oscillator is comprised of, e.g., S-R FF 31, a counter 33 and a clock signal oscillator 34. Counter 33 counts a clock signal from clock signal oscillator 34 so that it produces a set pulse and a reset pulse of H level with narrow pulse forms as indicated by graphs S33 and R33 in FIG. 7 respectively. Set pulse S33 is applied to set input terminal S of S-R FF 31, while reset pulse R33 is applied to reset input terminal of S-R FF 31. Set pulse S33 is produced with a prescribed period or pulse duration p3. Reset pulse R33 is also produced with the same period P3 but follows set pulse S33 with another prescribed period p4 which is well shorter than period p3. The duration of period p3 may be determined relatively freely but within a period that focus lens 16 scans optical record disc 11 to the end of its movable range, while period p4 is determined to a period that focus lens 16 fails to overrun the standard position in consideration of a transfer speed of pick-up device 12.

In reproducing operation, counter 33 applies set pulse S33 as shown in FIG. 7 to set input terminal S of S-R FF 31 at a timing t1 that period p3 has lapsed from the start of the reproducing operation. S-R FF 31 then applies control signal S31 of the H level to switch 27 well before focus lens 16 reaches the end of its movable range. If period p3 were considerably short in comparison to the period that focus lens 16 scans optical record disc 11 to the end of its movable range, pick-up actuator 24 may steadily drive pick-up device 12 due to drive voltage V28 which is set to a voltage sufficient for activating pick-up actuator 24. Therefore, pick-up device 12 is driven by pick-up actuator 24 in the same manner as described for the first embodiment shown in FIG. 1. Next, counter 33 applies reset pulse R33 as shown in FIG. 7 to reset input terminal R of S-R FF 31 at a timing t2 that period p4 has lapsed after timing t1. S-R FF 31 is then reset or fails to apply control signal S31 of the H level to switch 27, just before focus lens 16 reaches the standard position in pick-up device 12. Therefore, the movement of pick-up device 12 is stopped in the same manner as described for the first embodiment.

Figure 8:
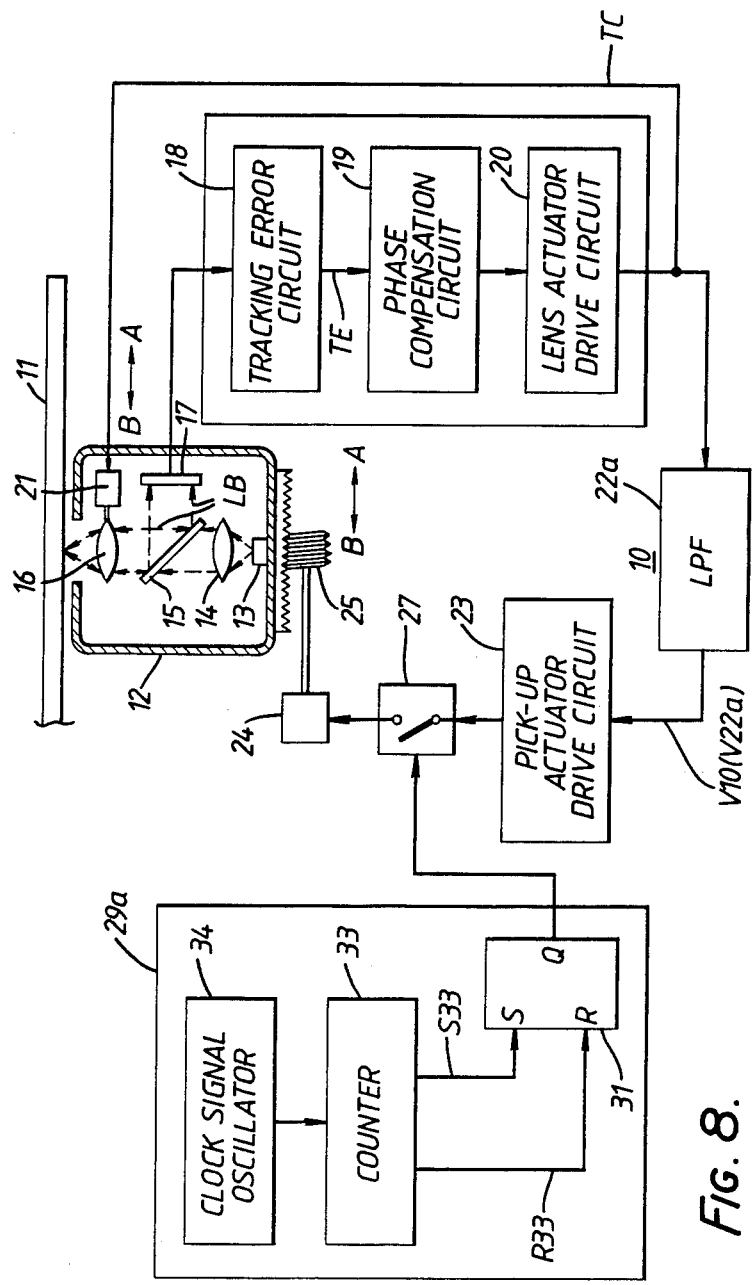
FIG. 8 is a block diagram of a disc information reproducing apparatus according to a fifth embodiment of the present invention.
Figure 9:
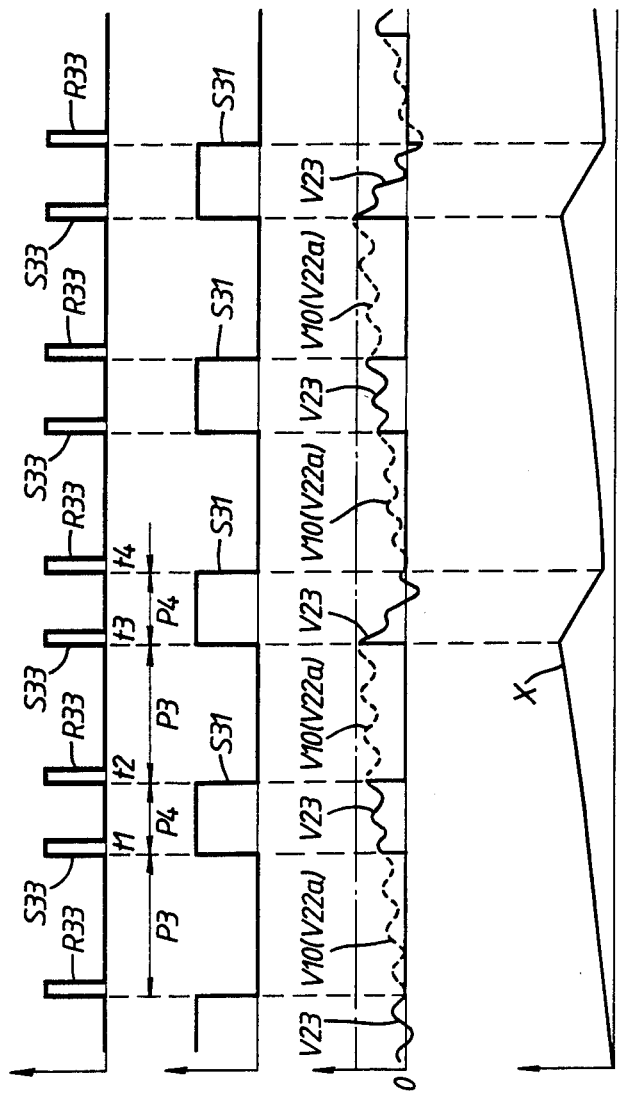
FIG. 9 is a timing chart used for explaining the operation of the apparatus shown in FIG. 8.

Referring now to FIGS. 8 and 9, there are shown a fifth embodiment of the present invention and graphs of timing chart for explaining an operation of the fifrth embodiment. In FIG. 8, switch 27, pick-up actuator 24 and pick-up actuator drive circuit 23 are connected to the servo control loop for focus lens 16 through a LPF 22a. Other portions of the fifth embodiment are equivalent to those of the fourth embodiment as shown in FIG. 6. Accordingly, descriptions will be mainly made for portions different from the fourth embodiment hereafter.

In FIG. 8, LPF 22a detects a DC component of lens actuator drive signal TC. The DC component of lens actuator drive signal TC, i.e., an output V22a of LPF 22a is applied to pick-up actuator 24 through swtich 27 and pick-up actuator drive circuit 23 as the drive voltage for pick-up actuator 24. Pick-up actuator drive circuit 23 applies to pick-up actuator 24 its output V23, a drive voltage responding to output V22a of LPF 22a when switch 27 is turned ON. As a result, pick-up actuator 24 is driven by the voltage based on the DC component of lens actuator drive signal TC. However, the application of the drive voltage to pick-up actuator 24 is controlled by pick-up actuator control circuit 29 in a manner identical with the fourth embodiment. The small ripples appearing on the waveform of output V22a of LPF 22a (see FIG. 9) are caused by an eccentricity of tracks with respect to the center of record disc 11.

In the reproducing operation, counter 33 applies a first pulse of set pulse S33 as shown in FIG. 9 to set input terminal S of S-R FF 31 at a timing t1 (see FIG. 9) that period p3 has lapsed from the start of the reproducing operation. Period p3 may be determined relatively freely but within a period that focus lens 16 scans optical record disc 11 to the end of its movable range in the fifth embodiment. For example, period p3 is set to a relatively short period close to a half of the period that focus lens 16 scans optical record disc 11 to the end of its movable range. S-R FF 31 then applies control signal S31 of the H level to switch 27 at timing T1, but output V22a of LPF 22a fails to activate pick-up actuator 24 for driving pick-up device 12 because output V22a of LPF 22a is lower than a voltage Vs3 as indicated in FIG. 9 that may activate pick-up actuator 24. Therefore, pick-up device 12 is kept unmoved and focus lens 16 continues to move in the direction of arrow A by being driven by lens actuator 21. Output V22a of LPF 22a then continues to increase. Counter 33 applies a second pulse of set pulse S33 to set input terminal S of S-R FF 31 at a timing t3 (see FIG. 9) that period p3 has lapsed from timimg t1, next to an application of a first pulse of reset pulse R33 to reset input terminal R of S-R FF 31 at a timing t2 (see FIG. 9) that period p4 has lapsed from timing t1. S-R FF 31 then applies control signal S31 of the H level to switch 27. Then output V22a of LPF 22a from LPF 22a is applied to pick-up actuator 24 through switch 27 in the ON state. At timing t3, output V22a of LPF 22a has increased to a sufficient voltage that may activate pick-up actuator 24 to drive pick-up device 12. As a result, pick-up device 12 is driven by pick-up actuator 24 in the same manner as described for the third embodiment shown in FIG. 4.

Next, counter 33 applies a second pulse of reset pulse R33 as shown in FIG. 9 to reset input terminal R of S-R FF 31 at a timing t4 (see FIG. 9) that period p4 has lapsed after timing t3. S-R FF 31 is then reset or fails to apply control signal S31 of the H level to switch 27, just before focus lens 16 reaches the standard position in pick-up device 12. Therefore, the movement of pick-up device 12 is stopped its movement its movement in the same manner as described for the third embodiment. After pick-up device 12 has stopped, a next movement of focus lens 16 in the direction of arrow A for continuing the reproducing operation is started.

The fifth embodiment may be modified further as follows. That is, pick-up actuator drive circuit 23 may be omitted if output V22a of LPF 22a is available for driving pick-up actuator 24 without any signal conversion.

What is claimed is:

1. A pick-up control circuit for use in an apparatus for reproducing information from an optical record disc using a light beam, wherein said information is recorded in a spiral track or a plurality of concentric tracks on one side of said disc, said pick-up control circuit comprising:

a movable carriage;
a source of said light beam, said source being mounted on said carriage;
means for focussing said light beam on said disc, said light beam focussing means being mounted in a standard position in said carriage and being movable by a predetermined range from said standard position;
a first means for actuating said light beam focussing means to deviate from said standard position in response to a tracking error signal so that said light beam following said concentric tracks or said spiral track;
a second means for actuating said carriage to move in a radial direction with respect to said disc, said light beam focussing means being moved to said standard position in said carriage relative to a movement of said carriage;
means associated with said light beam focussing means for detecting a deviation of said light beam focussing means from said standard position and producing a deviation signal in response thereto;
a power source for applying a drive voltage to said second actuating means;
a switch means connected between said power source and said second actuating means;
means responsive to said deviation signal for controlling said switch means to apply said drive voltage to said second actuating means, wherein said light beam focussing means is moved to said standard position on or before reaching an end of said movable range; and
means for producing said tracking error signal responsive to a deviation of said light beam from a center of said concentric or spiral track, and wherein said deviation detecting means comprises a circuit means connected to said tracking error signal producing means for detecting a DC component of said tracking error signal.

2. A pick-up control circuit for use in an apparatus for reproducing information from an optical record disc using a light beam, wherein said information is recorded in a spiral track or a plurality of concentric tracks on one side of said disc, said pick-up control circuit comprising:
- a carriage;
- a source of said light beam, said source being mounted on said carriage;
- means for focussing said light beam on said disc, said light beam focussing means being mounted in a standard position in said carriage and being movable by a predetermined range from said standard position;
- a first means for actuating said light beam focussing means to deviate from said standard position in response to a tracking error signal so that said light beam follows said concentric tracks or said spiral track;
- a second means for actuating said carriage to move in a radial direction with respect to said disc, said light beam focussing means being moved to said standard position in said carriage relative to a movement of said carriage;
- means associated with said light beam focussing means for detecting a deviation of said light beam focussing means from said standard position and producing a deviation signal in response thereto;
- a power source for applying a drive voltage to said second actuating means;
- a switch means connected between said power source and said second actuating means, said switch control means comprising a switch control circuit for rendering said switch means to an on state when said deviation signal exceeds a first preset value of said movable range of said light beam focussing means, or to an off state when said deviation signal is below a second preset value lower than said first value, and
- wherein said switch control circuit comprises a set-reset flip-flop, a first comparator and a second comparator, said first comparator comparing said deviation signal with said first preset value for producing a set signal, said second comparator comparing said deviation signal with said second preset value for producing a reset signal, and said set-reset flip-flop being applied to said set signal and said reset signal for generating a control signal to control said switch means.

3. A pick-up control circuit according to claim 2, wherein said switch control circuit further comprises a hysteresis circuit, said hysteresis circuit turning on when said deviation signal exceeds said first preset value and turning off when said deviation signal is below said second preset value.

4. A pick-up control circuit for use in an apparatus for reproducing information from an optical record disc using a light beam, wherein said information is recorded in a spiral track or a plurality of concentric tracks on one side of said disc, said pick-up control circuit comprising:
- a carriage;
- a source of said light beam, said source being mounted on said carriage;
- means for focussing said light beam on said disc, said light beam focussing means being mounted in a standard position in said carriage and being movable by a predetermined range from said standard position;
- a first means for actuating said light beam focussing means to deviate from said standard position in response to a tracking error signal so that said light beam follows said concentric tracks or said spiral track;
- a second means for actuating said carriage to move in a radial direction with respect to said disc, said light beam focussing means being moved to said standard position in said carriage relative to a movement of said carriage;
- means associated with said light beam focussing means for detecting a deviation of said light beam focussing means from said standard position and producing a deviation signal in response thereto;
- a power source for applying a prescribed constant drive voltage to said second actuating means;
- a switch means connected between said power source and said second actuating means; and
- means responsive to said deviation signal for controlling said switch means to apply said drive voltage to said second actuating means, wherein said light beam focussing means is moved to said standard position on or before reaching an end of said movable range.

5. A pick-up control circuit for use in an apparatus for reproducing information from an optical record disc using a light beam, wherein said information is recorded in a spiral track or a plurality of concentric tracks on one side of said disc, said pick-up control circuit comprising:
- a carriage;
- a source of said light beam, said source being mounted on said carriage;
- means for focussing said light beam on said disc, said light beam focussing means being mounted in a standard position in said carriage and being movable by a predetermined range from said standard position;
- a first means for actuating said light beam focussing means to deviate from said standard position in response to a tracking error signal so that said light beam follows said concentric tracks or said spiral track;
- a second means for actuating said carriage to move in a radial direction with respect to said disc, said light beam focussing means being moved to said standard position in said carriage relative to a movement of said carriage;
- means associated with said light beam focussing means for detecting a deviation of said light beam focussing means from said standard position and producing a deviation signal in response thereto;
- a power source for applying a drive voltage to said second actuating means, said power source comprising circuit means connected to said tracking error signal producing means for detecting a DC component of said tracking error signal;
- a switch means connected between said power source and said second actuating means;
- means responsive to said deviation signal for controlling said switch means to apply said drive voltage to said second actuating means, wherein said light beam focussing means is moved to said standard position on or before reaching an end of said movable range; and means for producing said tracking error signal responsive to a deviation of said light beam from a center of said track.

6. A pick-up control circuit for use in an apparatus for reproducing information from an optical record disc using a light beam, wherein said information is recorded in a spiral track or a plurality of concentric tracks on one side of said disc, said pick-up control circuit comprising:

a carriage;

a source of said light beam, said source being mounted on said carriage;

means for focussing said light beam on said disc, said light beam focussing means being mounted in a standard position in said carriage and being movable by a predetermined range from said standard position;

a first means for actuating said light beam focussing means to deviate from said standard position so that said light beam follows said concentric tracks or said spiral track;

a second means for actuating said carriage to move in a radial direction with respect to said disc wherein said light beam focussing means is moved to said standard position in said carriage;

a power source for applying a drive voltage to said second actuating means;

a switch means connected between said power source and said second actuating means; and means for controlling said switch means to apply said drive voltage intermittently to said second actuating means, wherein said light beam focussing means is moved to said standard position on or before reaching an end of said movable range.

7. A pick-up control circuit for use in an apparatus for reproducing information from an optical record disc using a light beam, wherein said information is recorded in a spiral track or a plurality of concentric tracks on one side of said disc, said pick-up control circuit comprising:

a carriage;

a source of said light beam, said source being mounted on said carriage;

means for focussing said light beam on said disc, said light beam focussing means being mounted in a standard position in said carriage and being movable by a predetermined range from said standard position;

a first means for actuating said light beam focussing means to deviate from said standard position so that said light beam follows said concentric tracks or said spiral track;

a second means for actuating said carriage to move in a radial direction with respect to said disc wherein said light beam focussing means is moved to said standard position in said carriage;

a power source for applying a drive voltage to said second actuating means;

a switch means connected between said power source and said second actuating means; and means for controlling said switch means to apply said drive voltage intermittently to said second actuating means, wherein said light beam focussing means is moved to said standard position on or before reaching an end of said movable range, wherein said switch control means comprises a timing signal oscillator for oscillating a control signal, said control signal intermittently switching said switch means.

8. A pick-up control circuit according to claim 7, wherein said signal oscillator comprises a set-reset flip-flop, a counter and a clock signal oscillator, said counter counting a clock signal applied from said clock signal oscillator to produce a set pulse and a reset pulse, said set-reset flip-flop being applied said set pulse and said reset pulse to generate said control signal.

9. A pick-up control circuit for use in an apparatus for reproducing information from an optical record disc using a light beam, wherein said information is recorded in a spiral track or a plurality of concentric tracks on one side of said disc, said pick-up control circuit comprising:

a carriage;

a source of said light beam, said source being mounted on said carriage;

means for focussing said light beam on said disc, said light beam focussing means being mounted in a standard position in said carriage and being movable by a predetermined range from said standard position;

a first means for actuating said light beam focussing means to deviate from said standard position so that said light beam follows said concentric tracks or said spiral track;

a second means for actuating said carriage to move in a radial direction with respect to said disc, wherein said light beam focussing means is moved to said standard position in said carriage;

a power source for applying a prescribed constant drive voltage to said second actuating means;

a switch means connected between said power source and said second actuating means; and means for controlling said switch means to apply said drive voltage intermittently to said second actuating means, wherein said light beam focussing means is moved to said standard position on or before reaching an end of said movable range.

10. A pick-up control circuit for use in an apparatus for reproducing information from an optical record disc using a light beam, wherein said information is recorded in a spiral track or a plurality of concentric tracks on one side of said disc, said pick-up control circuit comprising:

a carriage;

a source of said light beam, said source being mounted on said carriage;

means for focussing said light beam on said disc, said light beam focussing means being mounted in a standard position in said carriage and being movable by a predetermined range from said standard position;

a first means for actuating said light beam focussing means to deviate from said standard position so that said light beam follows said concentric tracks or said spiral track;

a second means for actuating said carriage to move in a radial direction with respect to said disc, wherein said light beam focussing means is moved to said standard position in said carriage;

a power source for applying a drive voltage to said second actuating means;

a switch means connected between said power source and said second actuating means;

means responsive to said signal producing means for controlling said switch means to apply said drive voltage to said second actuating means, wherein said light beam focussing means is moved to said standard position on or before reaching an end of said movable range; and means for producing a tracking error signal responsive to a deviation of said light beam from a center of said track, wherein said power source comprises a circuit means connected to said tracking error signal producing means for detecting a DC component of said tracking error signal.

* * * * *